United States Patent [19]

Pyrih et al.

[11] 4,258,013
[45] Mar. 24, 1981

[54] URANIUM RECOVERY FROM WET PROCESS PHOSPHORIC ACID

[75] Inventors: Roman Z. Pyrih; Robert S. Rickard, both of Golden; Orin F. Carrington, Arvada, all of Colo.

[73] Assignee: Earth Sciences Inc., Golden, Colo.

[21] Appl. No.: 833,247

[22] Filed: Sep. 14, 1977

[51] Int. Cl.² .................. C01G 43/02; C01G 43/00
[52] U.S. Cl. ......................... 423/10; 423/15; 423/17; 423/18; 423/20
[58] Field of Search ............ 423/10, 15, 17, 20, 423/18

[56] References Cited

U.S. PATENT DOCUMENTS

| | | | |
|---|---|---|---|
| 2,859,092 | 11/1958 | Bailes et al. | 423/10 |
| 2,859,094 | 11/1958 | Schmitt et al. | 423/10 |
| 2,860,031 | 11/1958 | Grinstead | 423/10 |
| 3,243,257 | 3/1966 | Coleman | 423/10 |
| 3,711,591 | 1/1973 | Hurst et al. | 423/10 |
| 3,790,658 | 2/1974 | Fox et al. | 423/18 |
| 3,835,214 | 9/1974 | Hurst et al. | 423/20 |
| 3,836,476 | 9/1974 | Baldwin et al. | 423/10 |
| 4,002,716 | 1/1977 | Sundar | 423/10 |
| 4,105,741 | 8/1978 | Wiewiorowski et al. | 423/10 |

*Primary Examiner*—Edward A. Miller
*Attorney, Agent, or Firm*—Sheridan, Ross, Fields & McIntosh

[57] ABSTRACT

Improvement in the process for recovering uranium from wet-process phosphoric acid solution derived from the acidulation of uraniferous phosphate ores by the use of two ion exchange liquid-liquid solvent extraction circuits in which in the first circuit (a) the uranium is reduced to the uranous form; (b) the uranous uranium is recovered by liquid-liquid solvent extraction using a mixture of mono- and di-(alkyl-phenyl) esters of orthophosphoric acid as the ion exchange agent; and (c) the uranium oxidatively stripped from the agent with phosphoric acid containing an oxidizing agent to convert uranous to uranyl ions, and in the second circuit (d) recovering the uranyl uranium from the strip solution by liquid-liquid solvent extraction using di(2-ethylhexyl)phosphoric acid in the presence of trioctylphosphine oxide as a synergist; (e) scrubbing the uranium loaded agent with water; (f) stripping the loaded agent with ammonium carbonate, and (g) calcining the formed ammonium uranyl carbonate to uranium oxide, the improvement comprising: (1) removing the organics from the raffinate of step (b) before recycling the raffinate to the wet-process plant, and returning the recovered organics to the circuit to substantially maintain the required balance between the mono and disubstituted esters; (2) using hydogren peroxide as the oxidizing agent in step (c); (3) using an alkali metal carbonate as the stripping agent in step (f) following by acidification of the strip solution with sulfuric acid; (4) using some of the acidified strip solution as the scrubbing agent in step (e) to remove phosphorus and other impurities; and (5) regenerating the alkali metal loaded agent from step (f) before recycling it to the second circuit.

28 Claims, 1 Drawing Figure

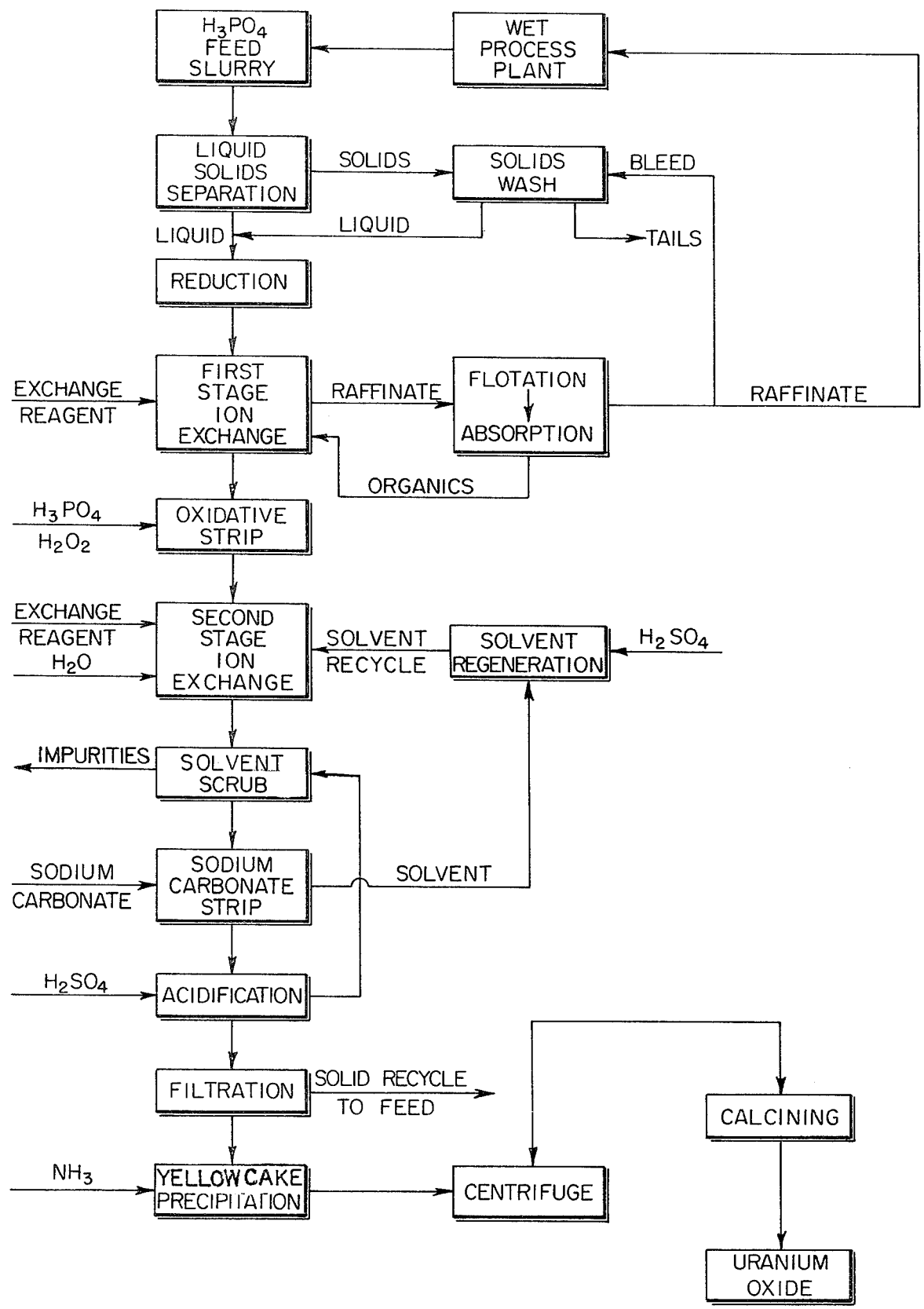

URANIUM RECOVERY FROM WET PROCESS PHOSPHORIC ACID

BACKGROUND OF THE INVENTION

The present invention relates to improvements in the process disclosed in U.S. Pat. No. 3,835,214, Hurst et al., assigned to the U.S. Atomic Energy Commission. As explained therein, the phosphoric acid by-product of the wet-process for producing phosphate fertilizer from uraniferous phosphate ores contains enough uranium to warrant the development of a profitable process for its recovery. Such a process must include the recycing of the substantialy uranium-free phosphoric acid to the wet-process plant in an acceptable degree of purity.

Briefly, the process of the patent comprises two liquid-liquid solvent extraction circuits for the recovery of uranium in the uranyl form as ammonium uranyl tricarbonate from which product uranium oxide is recovered by calcining. In the first circuit the uranium from the feed solution is reduced to the uranous form, contacted with an ion exchange agent selective for uranous uranium consisting of a mixture of mono- and di- (alkylphenyl esters of orthophosphoric acid (OPPA) dissolved in a suitable solvent, and the loaded agent is subjected to an oxidative strip with phosphoric acid and an oxidizing agent. In the second circuit the strip solution containing the uranium in uranyl form is extracted with the liquid-liquid sovent extraction agent di(2-ethylhexyl)phosphoric acid (DEHPA) to which has been added a synergist, trioctylphosphine oxide (TOPO), dissolved in an organic diluent. The loaded agent is scrubbed with water and stripped with ammonium carbonate to precipitate the uranium as ammonium uranyl carbonate from which the uranium oxide is recovered.

It has been found that processes like that disclosed in the above patent are subject to a number of disadvantages. The most feasible solvent extraction agent for recovering the uranium after it has been reduced to uranous form is a mixture of the mono- and di- (alkylphenyl) esters of orthophosphoric acid and it is well known that the ratio of these esters to each other in this process must be maintained within a required range. It has been found that when the prior process is run continuously, more of the monosubstituted ester is consumed than the disubstituted ester from time to time. It has also been observed that when the uranium-free phosphoric acid is returned to the wet-process plant without removal of the uranium process organics from the raffinate, a striking deterioration of rubber elements in the plant equipment, particularly the rubber lining of the plant evaporators, occurs because of the presence of these organics. The term "process organics" means organic substances added to the system during the process, rather than those in the feed material, e.g., the OPPA esters and organic diluent.

In the conventional process, after the uranium in uranous form is recovered on the agent it is subjected to an oxidative strip using evaporated phosphoric acid as a stripping agent and an oxidizing agent such as sodium thiosulfate, chlorine, or sodium chlorate. The difficulty with these oxidizing agent is that they introduce chemical impurities into the system, such as sodium, sulfur and chlorine, which are impossible to feasibly remove and the final results are contamination of phosphoric acid returned to the wet-process plant and contamination of the uranium oxide product.

It is also noted that water scrubbing the DEHPA-TOPO agent in the second circuit before stripping does not adequately remove such impurities as phosphorus, iron, and vanadium. Use of an ammonium carbonate strip of the oxidized uranium from the agent results in the precipitation of uranium in the strip concentrate solution and introduces the problem of organic wetting of the yellow cake product.

Recycling of the stripped organic of the second circuit without regeneration presents phase separation problems resulting from emulsions formed with sodium, aluminum, and silicon.

Accordingly, it is an object of this invention to provide a process for the recovery of uranium from a wet-process type phosphoric acid solution using two liquid-liquid solvent extraction circuits as discussed above in which the uranium process organics in the raffinate from the first circuit are substantially removed from the raffinate before recycling to the wet-process plant. The uranium process organics are returned to the first circuit thereby maintaining the required balance between the mono and disubstituted esters.

It is another object of this invention to provide a process as stated in which an oxidative agent is used with phosphoric acid in the first circuit strip which does not add contaminating materials to the system, nor form precipitates with other reactants in the evaporated phosphoric acid.

It is still another object of this invention to provide a process as stated in which a more effective scrubbing agent for the loaded organic in the second circuit is provided to remove contaminating impurities of the uranium oxide product.

It is a further object of this invention to provide a process as stated in which emulsions occurring from recycling of the liquid-liquid solvent extraction agent in the second circuit are prevented.

It is still a further object of this invention to provide a process as stated in which the stripping agent used in the second-circuit strip produces a totally soluble strip concentrate solution which can be treated in an external system for the precipitation of uranium thereby eliminating any problem of organic wetting of the yellow cake product.

SUMMARY OF THE INVENTION

The invention is an improvement in the two-circuit ion exchange process disclosed in U.S. Pat. No. 3,835,214 for the recovery of uranium from wet-process type phosphoric acid solution, in which in the first circuit the uranium in the feed solution is reduced to the uranous form, recovered with an OPPA or liquid-liquid solvent extraction agent, stripped with phosphoric acid and an oxidizing agent to form the uranyl form of uranium, in the second circuit the oxidized uranium is recovered with the extraction or liquid-liquid solvent extraction agent DEHPA combined with the additive TOPO as a synergist, the loaded agent is scrubbed with water, stripped with ammonium carbonate, and the uranium recovered from the strip solution by filtration, the improvement comprising the removal and recovery of all uranium process organics from the first circuit raffinate before recycling the raffinate beck to the wet-process plant, the use of hydrogen peroxide in the oxidative strip with phosphoric acid, the use of recycled acidified strip solution from the sodium carbonate strip as a scrub of the loaded agent in the second circuit prior to stripping, the use of sodium carbonate rather than ammonium carbonate as the second circuit stripping agent, and regeneration of the agent from the second circuit strip with sulfuric acid before recycling to prevent the formation of emulsions with resultant phase separation problems in the second circuit.

BRIEF DESCRIPTION OF THE DRAWINGS

FIG. 1 is a flow diagram illustrating the process of the invention.

DESCRIPTION OF THE PREFERRED EMBODIMENTS

The invention will now be described with reference to the accompanying drawing and illustrative examples.

The results recorded below were run on wet-process feed phosphoric acid which had a chemical profile typified by the following analysis. A typical feed solution received from a wet-process plant is as follows:

| | |
|---|---|
| $U_3O_8$, gpl: | 0.140 |
| emf, mv: | −260 |
| Total Fe, gpl: | 4.1 |
| $Fe^{+2}$, gpl: | 0.47 |
| $H_3PO_4$, %: | 39.1 |
| Specific Gravity: | 1.3085 |

FIRST CIRCUIT EXTRACTION

The extraction of uranium with the mono- and di-(alkyl-phenyl) esters of OPPA followed the procedure used in U.S. Pat. No. 3,835,214. The feed was preconditioned to an emf or −210 mv with iron to reduce the uranium to the uranous form. The emf should be more reducing than about −250 mv. The feed was then contacted with 0.32 molar OPPA dissolved in kerosene. Four counter-current extraction stages were used. Greater than 90 percent $U_3O_8$ extraction was consistently obtained. The following table presents extraction results based on actual circuit operation.

TABLE 1

EXTRACTION CIRCUIT
(After 225 Hours of Operation)

| Cell No. | $U_3O_8$, gpl Aqueous | $U_3O_8$, gpl Organic | $U_3O_8$ Extraction (%) |
|---|---|---|---|
| E-1 | 0.047 | 0.80 | 63.9 |
| E-2 | 0.024 | 0.29 | 81.5 |
| E-3 | 0.009 | 0.15 | 93.0 |
| E-4 | 0.009 | 0.15 | 93.0 |
| Feed | 0.130 | — | — |

REMOVAL OF ORGANICS FROM THE FIRST STAGE RAFFINATE

It was found that about 9.76 lb of uranium process organics were lost in every 1000 gal. of raffinate. The phosphoric acid raffinate from the primary ion exchange circuit is conventionally fed to wet-process plant evaporators for concentration from 29 percent $P_2O_5$ to 45 percent $P_2O_5$. The plant evaporators are rubber-lined and precautions must be taken to insure removal of process introduced organics from the raffinate or they will attack the rubber with resultant serious deterioration. The invention includes a method for removing the uranium process organics.

A method of analysis for organics in the raffinate was developed in which the absolute organic concentration in the raffinate samples was determined by total organic carbon assays. The presence of uranium process organics was monitored by surface tension measurements and verified by infrared spectroscopy. Multiple independent analytical techniques demonstrated the effectiveness of the organics removal and recovery process.

It was found that the uranium process organics can be substantially removed by combining a conventional flotation method with resin absorption with resin beads. Using this procedure all the organics introduced in the uranium recovery plant can be removed from phosphoric acid prior to its return to the wet-process plant.

The flotation tests were conducted in a conventional flotation cell. Experiments suggested that a flotation time of about twenty minutes was needed to remove most of the entrained uranium process organics from the raw raffinate. Total organic carbon assays and surface tension measurements showed that additional secondary treatment was necessary to further reduce the level of dissolved uranium process organics remaining in the flotation underflow.

The agent used in the secondary treatment was Amberlite XAD-4 resin in the form of beads, an experimental polymeric absorbent developed by Rohm and Haas. The agent is a completely hydrophobic, polystyrene, polymeric resin.

To test the absorbent's (agents) ability to remove dissolved and entrained uranium process organics from the raffinate, a column was assembled and packed with hydrated Amberlite XAD-4 resin. After preconditioning the polystyrene resin beads with methanol and back washing and classifying the demineralized water, the absorption cycle was started. Flotation underflow was utilized as the column feed. The absorption cycle was conducted at a down flow rate of about 7 bed volumes per hour. The first absorption cycle was taken to near saturation of the resin by uranium process organics. About 1217 bed volumes of raffinate were passed through the column in the first absorption cycle. Total organic carbon assays of the column effluent showed that substantially all of the uranium process organics were removed from the raffinate during the first 400 bed volumes of operation. This finding was confirmed by surface tension measurements on the column effluent and by qualitative infrared spectroscopy. Surprisingly, the absorbent was effective in removing uranium process organics from the strongly acid solution.

The uranium process organics were eluted off the resin beads with about 3-5 bed volumes of methanol. The methanol was eluted with demineralized water and the resin beads reclassified for the next absorption cycle. Six additional absorption-elution cycles were run on the same resin sample. About 4,956 bed volumes of raffinate were treated in total during these cycles. No loss in capacity to absorb uranium process organics from raffinate was observed.

The uranium process organics eluted from the resin beads with methanol were recovered by distilling off the methanol solvent. The recovered organics were recycled to the OPPA uranium extraction circuit.

No loss of the mono-alkyl or di-alkyl component of OPPA occurred when the uranium process organics recovered from raffinate flotation overflow and from the resin absorption column were recycled back to the extraction circuit.

USE OF HYDROGEN PEROXIDE AS THE OXIDANT

As stated above, the use of oxidants like sodium thiosulfate, sodium chlorate, and chlorine is objectionable because of the addition of contaminants to the system. Ozone and oxygen can be used. However, oxygen gas is inefficient and ozone gas reacts with uranium process organics. These disadvantages are not attendant to the use of hydrogen peroxide as the oxidant. Other advantages of hydrogen peroxide are that it forms no precipitate with other reactants in the evaporated phosphoric acid strip solution as does the sodium compound oxidizers and with its use no noxious gas like chlorine is given off.

The loaded organic from the extraction step is stripped with concentrated phosphoric acid containing sufficient amounts of hydrogen peroxide to oxidize the uranium and effect the transfer. The guide used for hydrogen peroxide addition was the total rate required to result in a strip concentrate emf between about $-500$ and $-800$ mv. Oxidant is not added to the final stage of the strip circuit to prevent carryover of the oxidant to the primary extraction circuit. About 9 molar phosphoric acid was used and 10 molar phosphoric acid is preferred, but weaker acid can be used.

Stripping tests with hydrogen peroxide were conducted on the loaded agent to show the effect of the presence of hydrogen peroxide on stripping efficiency. Table 2 summarizes typical stripping efficiencies found in bench shake-out tests incorporating different ratios of organic agent to aqueous strip solution.

TABLE 2

| Test No. | O/A | $H_2O_2$ (30%) Added (ml $H_2O_2$/l organic) | Strip Emf (mv) | $U_3O_8$ Stripped (%) |
|---|---|---|---|---|
| 1 | 7.5 | 8 | $-590$ | 74 |
| 2 | 5 | 7 | $-600$ | 74 |
| 3 | 3 | 5 | $-720$ | 78 |
| 4 | 1 | 4 | $-740$ | 93 |
| 5 | 0.5 | 4 | $-740$ | 96 |
| 6 | 0.1 | 4 | $-780$ | 98 |

The table shows stripping efficiency varying from about 74–98 percent. Hydrogen peroxide was effective in removing 98 percent of the uranium oxide being stripped.

To further show the stripping efficiency of phosphoric acid and hydrogen peroxide oxidant the following analytical profile data on the extraction and stripping circuits based on actual results is included.

TABLE 3

| Stage No. | Aqueous Phase $U_3O_8$ gpl | Organic Phase $U_3O_8$ gpl | Calculated Efficiency $U_3O_8$ Extraction % | Calculated Efficiency $U_3O_8$ Stripped % |
|---|---|---|---|---|
| Extraction-1 | 0.094 | 1.08 | 83.2 | — |
| Extraction-2 | 0.045 | — | 91.9 | — |
| Extraction-3 | 0.015 | — | 97.3 | — |
| Extraction-4 | 0.035 | — | 93.7 | — |
| Strip-1 | — | 0.35 | — | 67.6 |
| Strip-2 | — | 0.23 | — | 78.7 |
| Strip-3 | — | 0.10 | — | 90.7 |
| Aqueous Feed | 0.56 | — | — | — |

SECOND CIRCUIT EXTRACTION

The oxidized uranium in the pregnant phosphoric acid strip solution was extracted with 0.3 molar DEHPA liquid-liquid solvent extraction agent in the hydrogen form to which a synergistic agent had been added, the mixture being dissolved in an alphatic diluent such as Amsco 460 solvent.

Tests were conducted to show the effect of $H_3PO_4$ strength on the extraction efficiency of the DEHPA-TOPO mixture, the results of the tests being recorded in the following table.

TABLE 4

| O/A Ratio | $U_3O_8$ EXTRACTED (%) Test 1 6M $H_3PO_4$ | Test 2 4M $H_3PO_4$ | Test 3 4M $h_3PO_4$ |
|---|---|---|---|
| 10 | 84.62 | 98.07 | 98.37 |
| 5 | 75.38 | 95.79 | 96.52 |
| 3 | 63.85 | 92.86 | 95.76 |
| 2 | 53.08 | 87.14 | 91.30 |
| 1 | 30.76 | 68.57 | 85.87 |
| 0.5 | 22.69 | 42.86 | 54.35 |
| 0.25 | 13.46 | 22.29 | 29.89 |
| 0.10 | 5.86 | 9.29 | 11.96 |
| Feed, $U_3O_8$, gpl | 13.00 | 14.00 | 9.2 |

The results of the table show that $U_3O_8$ is not extracted as efficiently from 6M $H_3PO_4$ as had been recommended by prior art. In contrast, however, $U_3O_8$ extraction from 4 M $H_3PO_4$ was more efficient.

Synergistic combinations of DEHPA with trioctylphosphine oxide (TOPO), di-butyl butylphosphonate (DBBP), and tributyl phosphate (TBP) were tested. Table 5 summarizes typical second circuit bench shake-out test results incorporating different synergistic combinations of DEHPA. Aliquots of 4 M $H_3PO_4$ assaying about 7.2 g $U_3O_8$/l were contacted with aliquots of 0.3 M DEHPA-0.075 M TOPO, 0.3 M DEHPA-0.05 M DBBP, 0.3 M DEHPA-0.1 M DBBP, and 0.3 M DEHPA-0.1 M TBP.

The synergistic combination of DEHPA with TOPO demonstrated the best extraction capability. However, the DEHPA-DBBP and DEHPA-TBP combinations also demonstrated acceptable extraction efficiencies.

TABLE 5
URANIUM EXTRACTION WITH SYNERGISTIC COMBINATIONS OF DEHPA WITH TRIOCTYLPHOSPHINEOXIDE (TOPO), DI-BUTYL BUTYLPHOSPHONATE (DBBP) AND TRIBUTYLPHOSPHATE (TBP)

| Sample No. | Description | O/A | $U_3O_8$ Concentration Aqueous (g/l) | Organic (g/l) | Percent $U_3O_8$ Extracted (%) |
|---|---|---|---|---|---|
| 1 | 0.3M DEHPA-0.075M TOPO | 5 | 0.17 | | (98) |
| 2 | 0.3M DEHPA-0.075M TOPO | 2 | 0.46 | | (94) |
| 3 | 0.3M DEHPA-0.075M TOPO | 1 | 1.2 | 5.7 | 83 |
| 4 | 0.3M DEHPA-0.075M TOPO | 0.5 | 2.3 | 8.5 | 65 |

TABLE 5-continued
URANIUM EXTRACTION WITH SYNERGISTIC COMBINATIONS OF DEHPA WITH TRIOCTYLPHOSPHINEOXIDE (TOPO), DI-BUTYL BUTYLPHOSPHONATE (DBBP) AND TRIBUTYLPHOSPHATE (TBP)

| Sample No. | Description | O/A | $U_3O_8$ Concentration Aqueous (g/l) | $U_3O_8$ Concentration Organic (g/l) | Percent $U_3O_8$ Extracted (%) |
| --- | --- | --- | --- | --- | --- |
| 5 | 0.3M DEHPA-0.075M TOPO | 0.2 | 4.4 | 11.4 | 34 |
| 6 | 0.3M DEHPA-0.05M DBBP | 5 | 0.99 | | (86) |
| 7 | 0.3M DEHPA-0.05M DBBP | 2 | 2.2 | | (70) |
| 8 | 0.3M DEHPA-0.05M DBBP | 1 | 3.3 | 3.5 | 51 |
| 9 | 0.3M DEHPA-0.05M DBBP | 0.5 | 4.4 | 4.1 | 32 |
| 10 | 0.3M DEHPA-0.05M DBBP | 0.2 | 5.4 | | (26) |
| 11 | 0.3M DEHPA-0.1M DBBP | 5 | 0.62 | 1.2 | 91 |
| 12 | 0.3M DEHPA-0.1M DBBP | 2 | 1.5 | | (79) |
| 13 | 0.3M DEHPA-0.1M DBBP | 1 | 2.9 | | (60) |
| 14 | 0.3M DEHPA-0.1M DBBP | 0.5 | 4.05 | | (44) |
| 15 | 0.3M DEHPA-0.1M DBBP | 0.2 | 5.4 | | (26) |
| 16 | 0.3M DEHPA-0.1M TBP | 5 | 1.6 | | (78) |
| 17 | 0.3M DEHPA-0.1M TBP | 2 | 2.7 | | (63) |
| 18 | 0.3M DEHPA-0.1M TBP | 1 | 4.3 | | (41) |
| 19 | 0.3M DEHPA-0.1M TBP | 0.5 | 5.2 | | (28) |
| 20 | 0.3M DEHPA-0.1M TBP | 0.2 | 5.9 | | (19) |

SECOND CIRCUIT SCRUB

Before stripping the oxidized uranium loaded on the DEHPA-TOPO liquid-liquid solvent extraction agent, the agent and solvent were scrubbed to remove impurities such as phosphorus, iron, and others. Water which was used as a scrubbing agent in the prior art was found to be inadequate for removing metal impurities which, if not removed, end up in the final uranium oxide product. As the flow diagram of FIG. 1 shows, the oxidized uranium on the scrubbed agent was stripped with sodium carbonate. The strip solution was acidified with sulfuric acid to remove all carbonate. As the flow diagram further shows, part of this acidified strip solution is recycled to scrub phosphorus and other impurities before the uranium is stripped off with sodium carbonate.

In order to test the effectiveness of acidified sodium carbonate strip concentrate as a scrubbing agent, comparative tests were made with various scrubbing agents. The results are summarized in the following table.

TABLE 6

| | | Metals in Organic Phase | | | | | |
| --- | --- | --- | --- | --- | --- | --- | --- |
| | | $H_3PO_4$, (gpl) | | Fe, (gpl) | | $U_3O_8$, (gpl) | |
| Test No. | Scrub Solution | Loaded Organic | Scrubbed Organic | Loaded Organic | Scrubbed Organic | Loaded Organic | Scrubbed Organic |
| 1 | Water | 1.0 | 0.38 | — | 0.014 | 9.26 | 9.12 |
| 2 | 1N $H_2SO_4$ | 1.0 | 0.25 | 0.018 | 0.017 | 9.4 | 9.3 |
| 3 | Acidified $U_3O_8$ Strip Concentrate | 0.8 | 0.05 | 0.048 | 0.041 | 9.0 | 19.4 |
| 4 | Same | 0.8 | 0.06 | 0.045 | 0.044 | 9.3 | 19.0 |

Tests 3 and 4 show the effectiveness of the acidified strip concentrate in reducing the amount of phosphoric acid on the loaded organic. In these tests, the phosphate was reduced from 0.8 to 0.05 gpl in test 4 and 0.06 gpl in test 5. These results are much superior to those obtained with the other scrub solutions.

The use of acidified strip solution, in addition to the simple scrubbing to remove entrained impurities, provides a high concentration of uranium that is sufficient to saturate the liquid-liquid solvent extraction agent with respect to uranium. The increased loading of uranium on the agent displaces other metal impurities and an additional purification step is realized. The specific affinity of the liquid-liquid solvent extraction agent for uranium allows the uranium to load and displace the other impurities. Table 6, test 3 and 4 show the ratio of uranium to iron to be 197 in the loaded organic as compared to 451 in the scrubbed organic.

SECOND CIRCUIT STRIP

The stripping agent used is sodium carbonate rather than the ammonium carbonate of the prior art. The advantages of using sodium carbonate over ammonium carbonate are that sodium carbonate solution produces a totally soluble strip concentrate solution at a materially higher concentration of uranium. This concentrate can then be treated in an external system for the precipitation of uranium and recycle of filtrate. Use of sodium carbonate solution eliminates the problem of organic wetting of the yellow cake product which occurs when ammonium carbonate is used as a stripping agent. Use of sodium carbonate maintains the solution at a high final pH so that all potential precipitates remain soluble in the strip concentrate, thus eliminating solids accumulation in the strip circuit.

Tests were conducted to show the efficiency of sodium carbonate as a stripping agent. The sodium carbonate solution contained 150 gpl $Na_2CO_3$. Conventional stripping procedure was used. Representative results are presented in Table 7 below.

TABLE 7

| Test No. | Scrubbed Organic $U_3O_8$ gpl | Strip O/A Ratio | $U_3O_8$ in Strip Concentrate gpl | Stripped Organic gpl $U_3O_8$ |
| --- | --- | --- | --- | --- |
| 1 | 20.0 | 2.0 | 51.4 | 0.04 |
| 2 | 19.4 | 2.0 | 48.2 | 0.03 |
| 3 | 19.0 | 2.0 | 48.4 | 0.05 |

The goal of about 50 grams per liter $U_3O_8$ in the strip concentrate was achieved. The high pH value (8 and above) obtained in the stripped concentrate eliminated any solids accumulation in the mixer-settlers. This, of course, is an advantage of sodium carbonate as a stripping agent over ammonium carbonate.

It was found that sodium carbonate strip contact time and the concentration of the sodium carbonate strip solution were important variables for efficient stripping. Results obtained using 75 gpl and 100 gpl sodium carbonate strip solutions are set forth in the following table.

TABLE 8

| Cumulative Contact Time min | 75-gpl $Na_2CO_3$ (O/A = 3) | | 100 gpl $Na_2CO_3$ (O/A = 2) | |
|---|---|---|---|---|
| | Stripped Organic $U_3O_8$ gpl | $U_3O_8$ Stripped % | Stripped Organic $U_3O_8$ gpl | $U_3O_8$ Stripped % |
| 1 | 2.78 | 67.7 | 0.28 | 96.9 |
| 2 | 2.36 | 72.6 | 0.28 | 96.9 |
| 3 | 1.86 | 78.4 | 0.28 | 96.9 |
| 4 | 1.42 | 83.5 | 0.28 | 96.9 |
| 5 | 1.00 | 88.4 | 0.28 | 96.9 |
| Loaded Organic Feed, gpl | 8.60 | — | 9.00 | — |

From the results it can be seen that at least five minutes with the use of a 75 gpl $Na_2CO_3$ at an organic to aqueous ratio of 3 should be used but with 100 gpl sodium carbonate strip solution effective stripping is accomplished at an organic to aqueous ratio of 2 in one minute.

AGENT REGENERATION

It was found that recycle of the stripped DEHPA-TOPO agent without further treatment resulted in serious phase separation problems in the second circuit. An initial run was set up without an acid regeneration step on the stripped agent. It was found that appreciable emulsion accumulated in the extraction section within the first two hours of operation. Spot analysis of the feed and the raffinate indicated that silica hydrolysis equivalent to about 5.5 gpl silicon dioxide had occurred during extraction. This was caused by the alkalinity of the incoming stripped DEHPA-TOPO agent.

Emulsion in the extraction circuit occurred when excess of sodium was introduced with the DEHPA-TOPO organic. Sodium from the sodium carbonate strip circuit became entrained in the organic solvent carrying the DEHPA-TOPO agent. It was found that the problem could be eliminated by conducting an acid regeneration step on the organic agent before recycling. By contacting the agent organic with dilute sulfuric acid, the excess sodium entrained in the agent organic was removed and the DEHPA-TOPO agent was converted from the sodium to the acid form. Emulsion formation in the second circuit was eliminated.

SUMMARY OF SECOND CIRCUIT OPERATION

In order to summarize the results as shown in the successful operation of the second circuit, the following analytical profile data of the second circuit is provided in Table 9.

TABLE 9

| Analytical Profile Data of Second Circuit | | | |
|---|---|---|---|
| Extraction Circuit (O/A = 1) | | | |
| Stage No. | $U_3O_8$, gpl Raffinate | Organic | $U_3O_8$ Extraction % |
| E-1 | 3.20 | 9.00 | 64.8 |
| E-2 | 1.10 | 3.10 | 87.9 |
| E-3 | 0.25 | 1.00 | 97.2 |
| E-4 | 0.13 | 0.15 | 98.3 |
| Aqueous Feed | 9.1 | — | — |

| Scrubbing Circuit (O/A = 3) (49.7 gpl $U_3O_8$ in Scrubbing Solution, pH 1.8) | | | | |
|---|---|---|---|---|
| | Aqueous Phase | | Organic Phase | |
| Stage No. | $H_3PO_4$ gpl | $U_3O_8$ gpl | $H_3PO_4$ gpl | $U_3O_8$ gpl |
| SC-1 | 3.77 | 0.005 | — | — |
| SC-2 | 0.12 | 0.019 | — | 11.4 |
| SC-3 | 0.02 | 0.27 | 0.08 | 19.4 |
| Loaded Organic | — | — | 0.80 | g.0 |

| Stripping Circuit (O/A = 2 to 2.08) | | | | |
|---|---|---|---|---|
| Stage No. | Aqueous Phase $U_3O_8$ gpl | Organic Phase $U_3O_8$ gpl | Equilibrium pH | $U_3O_8$ Stripped % |
| S-1 | 48.2 | 1.10 | 9.3 | 94.3 |
| S-2 | 10.0 | 0.25 | 10.2 | 98.7 |
| S-3 | 3.4 | 0.03 | 10.7 | 99.8 |
| Loaded Organic | — | 19.4 | — | — |

| Organic Regeneration Circuit (O/A = 1.5) | | |
|---|---|---|
| | Aqueous Phase | |
| Stage No. | $U_3O_8$ gpl | $H_2SO_4$ gpl |
| R-1 | 0.004 | 16.0 |

YELLOW CAKE PRECIPITATION AND CALCINING

A representative sample of pregnant sodium carbonate strip solution was processed for recovery of uranium oxide. In a typical processing, the strip solution was neutralized to a pH of about 6.5 with $H_2SO_4$ and filtered for iron, vanadium and other contaminant removal. The filtrate was acidified with sulfuric acid to pH 1.85 to facilitate carbon dioxide removal. Yellow cake was precipitated by effecting a pH change in the acidified pregnant strip solution to about 7.5-8.0 with anhydrous ammonia. The analysis of the yellow cake product is set forth in the following table.

TABLE 10

| | Yellow Cake Product Analysis | |
|---|---|---|
| Item | Product 1 (1.0 liter of solution filtered at pH 6.5) | Product 2 (1.0 liter of solution not filtered) |
| Dry Yellow Cake Weight, g | 54.4 | 55.5 |
| Dry Residue Weight at pH 6.5, g | 1.1 | |
| Yellow Cake Analysis, % | | |
| $U_3O_8$ | 85.6 | 84.7 |
| NA | 4.8 | 4.9 |
| Fe | 0.012 | 0.25 |
| $PO_4$ | 0.06 | 0.24 |
| $V_2O_5$ | 0.06 | 0.08 |

The yellow cake analysis is within maximum impurity limits.

The slurry obtained by the precipitation of uranium is sent to a thickener for the initial solid-liquid separation. The solution overflowing the thickener can be reconstituted by the addition of sodium carbonate for recycle to the strip circuit. The thickened yellow cake product is further densified and washed by centrifuge and calcined to produce the final uranium oxide product.

For the first circuit strip with phosphoric acid the strip solution preferably contains from about 39 to about 55 percent phosphoric acid, a preferred stripping time is from about ½ to about 5 minutes, and an O/A ratio of about 0.1 to about 20 is preferred. Hydrogen peroxide is added in a preferred amount of about 0.4–3.4 gpl of organic feed.

For the second circuit strip with sodium carbonate a preferred concentration is about 50–200 gpl sodium carbonate, a preferred contact time is about ½ to about 5 minutes, and a preferred O/A ratio is about 0.5 to about 10. A molarity of about 0.5–3 is used with about 1 being preferred. The acidified strip solution for the second circuit scrub should have a pH of about 1 to about 2.

Other mineral acids than sulfuric acid, such as, hydrochloric and nitric acids may be used to regenerate the sodium loaded liquid-liquid solvent extraction agent in the second circuit after it is stripped of the loaded uranium. Other alkali metal carbonates suitable as second circuit stripping agents are potassium and lithium carbonates. A preferred equilibrium pH for the alkali metal carbonate stripping agent is between about 8 and 10.

SUMMARY

The examples set forth above show that the first circuit extraction produces over 90 percent $U_3O_8$ extraction and that hydrogen peroxide is an effective oxidizing agent when applied to first circuit stripping. The examples show that the second circuit operation re-extracts approximately 98 percent of the uranium oxide from the first circuit strip solution when diluted to about 4 molar phosphoric acid. About 99 percent of the uranium oxide was recovered from the loaded organic with sodium carbonate strip solution.

The results further show that substantially all of the uranium process organics can be removed and recovered from the raffinate of the first circuit before the raffinate is returned to the wet-process plant. By returning the uranium process organics to the first extraction circuit, the required ratio of mono to disubstituted alkyl phenyl ester of orthophosphoric acid is maintained. The results also show that sodium carbonate is an effective second circuit stripping agent, that the acidified sodium carbonate strip solution is an effective scrubbing agent for the second circuit scrub, and that the regeneration of the second circuit agent with dilute sulfuric acid before recycling eliminates the formation of emulsions in the second circuit extraction.

What is claimed is:

1. A process for the recovery of uranium from wet-process phosphoric acid derived from the acidification of uraniferous phosphate ores which comprises:
   (a) reducing the uranium to the uranous form;
   (b) contacting the reduced solution with a liquid-liquid solvent extraction agent which is a mixture of a mono- and di- (alkyl-phenyl) esters of orthophosphoric acid dissolved in an inert organic diluent, to effect transfer of the uranium into the organic phase;
   (c) stripping the uranium from the organic phase of step (b) with a phosphoric acid solution containing a sufficient amount of an oxidizing agent to convert uranous uranium to uranyl uranium;
   (d) contacting the diluted strip solution of step (c) with an organic phase containing as the liquid-liquid solvent extraction agent di(2-ethylhexyl) phosphoric acid and a synergistic agent dissolved in an inert organic diluent to effect transfer of the uranyl uranium into the organic phase;
   (e) stripping the loaded agent of step (d) with an alkali metal carbonate solution;
   (f) acidifying the strip solution of step (e) to precipitate iron, vanadium, and other impurities;
   (g) adding ammonia to the purified acidic solution of step (f) to precipitate the uranium, and
   (h) calcining the precipitated product of step (g) to a purified uranium oxide product.

2. The process of claim 1 in which the alkali metal carbonate is sodium carbonate.

3. The process of claim 1 in which the loaded agent of step (d) is scrubbed prior to stripping step (e).

4. The process of claim 3 in which the scrubbing is performed with at least a portion of the acidified strip solution of step (f).

5. The process of claim 1 in which the liquid-liquid solvent extraction agent in the stripped organic of step (e) in the sodium form is converted to the hydrogen form with a mineral acid and recycled to step (d).

6. The process of claim 5 in which the acid is sulfuric acid.

7. The process of claim 1 in which the oxidizing agent of step (c) is hydrogen peroxide.

8. The process of claim 1 in which uranium process organics from the aqueous raffinate resulting from the first uranium extraction step utilizing the OPPA-esters as extractants are removed from the raffinate of step (b).

9. The process of claim 8 in which the removed organics are returned to the organic phase of step (b) to substantially maintain the required balance of mono- and di- (alkyl-phenyl) esters of orthophosphoric acid in the liquid-liquid solvent extraction agent.

10. The process of claim 8 in which the process organics-free raffinate is returned to a wet-process phosphoric acid circuit.

11. The process of claim 8 in which the organics are removed by subjecting the raffinate sequentially to a flotation step and an absorption step on hydrophobic polystyrene beads.

12. The process of claim 11 in which the process organics are removed from the polystyrene beads by elution with methanol.

13. The process of claim 3 in which the ion exchange agent in the stripped organic of step (e) in the sodium form is converted to the hydrogen form with sulfuric acid and recycled to step (d).

14. The process of claim 3 in which the scrub is performed with at least a portion of the acidified strip solution of step (f) and the liquid-liquid solvent extraction agent in the stripped organic of step (e) in the sodium form is converted to the hydrogen form with sulfuric acid and recycled to step (d).

15. The process of claim 1 in which in step (a) the feed solution has been reduced to an emf more reducing than about −250 mv.

16. The process of claim 1 in which in step (c) the strip solution contains from about 39 to about 55 percent phosphoric acid, a stripping time of about ½ to about 5 minutes is used and an organic to aqueous ratio of about 0.1 to about 20 is used.

17. The process of claim 2 in which in step (e) a concentration of about 50 to about 200 gpl sodium carbonate is used, a contact time of about ½ to about 5 minutes is used and an organic to aqueous ratio of about 0.5 to about 10 is used.

18. The process of claim 2 in which in step (e) the molarity of the strip solution varies from about 0.5 to about 3.

19. The process of claim 18 in which the molarity of the strip solution is about 1.

20. The process of claim 1 in which in step (d) the synergistic agent is a member selected from the group consisting of trioctylphosphine oxide, di-butyl butylphosphonate and tributyl phosphate.

21. The process of claim 20 in which the synergistic agent is trioctylphosphine oxide.

22. The process of claim 20 in which the synergistic agent is di-butyl butylphosphonate.

23. The process of claim 20 in which the synergistic agent is tributyl phosphate.

24. The process of claim 1 in which in step (e) the alkali metal carbonate solution has an equilibrium pH between about 8 and 10.7.

25. The process of claim 2 in which in step (e) the alkali metal carbonate solution has an equilibrium pH between about 8 and about 10.7.

26. A process for the recovery of uranium from a wet-process phosphoric acid derived from the acidification of uraniferous phosphate ore which comprises:
(a) reducing the uranium to the uranous form;
(b) contacting the reduced solution of (a) with a liquid-liquid solvent extraction agent which is a mixture of mono- and di-(alkyl-phenyl) esters of orthophosphoric acid dissolved in an inert organic diluent, to effect transfer of the uranium into the organic phase;
(c) removing uranium process organics from the raffinate of step (b) and returning at least some of them to the organic phase of step (b) to substantially maintain the required balance of mono- and disubstituted phenyl esters of orthophosphoric acid in the ion exchange agent;
(d) stripping the uranium from the organic phase of step (b) with a phosphoric acid solution containing a sufficient amount of hydrogen peroxide to convert the uranous to uranyl uranium;
(e) contacting the diluted strip solution of step (d) with an organic phase containing as the liquid-liquid solvent extraction agent di(2-ethylhexyl) phosphoric acid and a synergistic agent dissolved in an inert diluent to effect transfer of the uranyl uranium to the organic phase;
(f) scrubbing the organic phase of step (e) with at least a portion of the acidified strip solution of step (i) below to remove phosphorus and other impurities;
(g) stripping the scrubbed organic phase of step (e) with an alkali metal carbonate solution;
(h) converting the liquid-liquid solvent extraction agent in the stripped organic of step (g) in the sodium form to the hydrogen form with sulfuric acid and recycling it to step (e);
(i) acidifying the strip solution of step (g) with sulfuric acid to precipitate iron, vanadium, and other impurities;
(j) adding ammonia to the purified acidic solution of step (i) to precipitate the uranium, and;
(k) calcining the precipitated product of step (j) to a purified uranium oxide product.

27. The process of claim 26 in which in step (g) the alkali metal carbonate solution has an equilibrium pH between about 8 and about 10.7.

28. In the process for recovery of uranium from wet process phosphoric acid derived from the acidification of uraniferous phosphate ore in which the uranium in the solution is reduced to uranous uranium, recovered from the solution in a first liquid-liquid solvent extraction circuit with a liquid-liquid solvent extraction agent consisting essentially of a mixture of mono- and di-(alkyl-phenyl) esters of orthophosphoric acid dissolved in an inert organic diluent, the raffinate recycled to the wet process plant, oxidatively stripping the uranium from the agent with phosphoric acid solution containing a sufficient amount of an oxidizing agent to convert the uranous to uranyl ions, recovering the uranyl ions from the strip solution in a second liquid-liquid solvent extraction circuit with an liquid-liquid solvent extraction agent consisting essentially of di(2-ethylhexyl) phosphoric acid and a synergistic concentration of trioctylphosphine oxide dissolved in an inert organic diluent, scrubbing the loaded agent of the second circuit with water to remove phosphate ions, stripping the scrubbed agent with ammonium carbonate solution to form a solution or slurry of ammonium uranyl tricarbonate, recycling the stripped agent to the second liquid-liquid solvent extraction step and calcining the ammonium uranyl tricarbonate to a uranium oxide product, the improvement which comprises removing uranium process organics from the aqueous raffinate resulting from the first uranium extraction step utilizing the OPPA-esters as extractants before recycling it to the wet process plant, adding the recovered organics to the first liquid-liquid solvent extraction step to maintain the proper ratio of mono- and disubstituted components in the liquid-liquid solvent extraction mixture, using phosphoric acid stripping solution containing about 39-55 percent phosphoric acid, a stripping time of about ½ to 5 minutes and an organic to aqueous ratio of about 0.1 to 20, the stripping solution containing hydrogen peroxide as the oxidizing agent in an amount of about 0.4 to 3.4 grams per liter of organic feed, scrubbing the loaded liquid-liquid solvent extraction agent of the second circuit with loaded sodium carbonate stripping solution from the immediately succeeding step which has been acidified, stripping the scrubbed agent with sodium carbonate solution having a concentration of about 50-200 grams per liter sodium carbonate in a strip contact time of about ½ to 5 minutes using an organic to aqueous ratio of about 0.5 to about 10, regenerating the stripped agent of the second circuit with sulfuric acid before recycling it to the second liquid-liquid solvent extraction step, acidifying the loaded sodium carbonate strip solution to remove impurities, adding ammonia to the acidified sodium carbonate strip solution to precipitate the uranium, and calcining the precipitated product to a purified uranium oxide product.

* * * * *